US012729313B2

(12) United States Patent
Zhao et al.

(10) Patent No.: US 12,729,313 B2
(45) Date of Patent: Sep. 8, 2026

(54) AQUEOUS COMPOSITION

(71) Applicant: Dow Global Technologies LLC, Midland, MI (US)

(72) Inventors: Yaguang Zhao, Shanghai (CN); Jianming Xu, Shanghai (CN); Wei Cui, Shanghai (CN); Zhen Qian, Shanghai (CN)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 565 days.

(21) Appl. No.: 18/251,785

(22) PCT Filed: Dec. 30, 2020

(86) PCT No.: PCT/CN2020/141227
§ 371 (c)(1),
(2) Date: May 4, 2023

(87) PCT Pub. No.: WO2022/141151
PCT Pub. Date: Jul. 7, 2022

(65) Prior Publication Data

US 2024/0018369 A1 Jan. 18, 2024

(51) Int. Cl.

| | |
|---|---|
| ***C09D 7/48*** | (2018.01) |
| ***C08F 220/18*** | (2006.01) |
| ***C08K 5/17*** | (2006.01) |
| ***C09D 7/63*** | (2018.01) |
| ***C09D 133/06*** | (2006.01) |

(52) U.S. Cl.
CPC .......... *C09D 7/48* (2018.01); *C08F 220/1804* (2020.02); *C08K 5/17* (2013.01); *C09D 7/63* (2018.01); *C09D 133/064* (2013.01); *C08F 2800/20* (2013.01)

(58) Field of Classification Search
CPC ........ C09D 7/48; C09D 7/63; C09D 133/064; C08F 220/1804; C08F 2800/20; C08K 5/17
See application file for complete search history.

(56) References Cited

U.S. PATENT DOCUMENTS

2011/0166257 A1* 7/2011 Bohling ............... C09D 131/04 523/328

FOREIGN PATENT DOCUMENTS

| | | |
|---|---|---|
| CN | 107474179 | 12/2017 |
| CN | 110711544 | 1/2020 |

OTHER PUBLICATIONS

Brandrup, "Polymer Handbook", Interscience Publishers.
Fox, Bull. Am. Physics Soc., 1956, vol. 1, No. 3, p. 123.
Search Report and Written Opinion from corresponding International Application No. PCT/CN2020/141227.

* cited by examiner

*Primary Examiner* — Jiangtian Xu
(74) *Attorney, Agent, or Firm* — CANTOR COLBURN LLP

(57) ABSTRACT

An aqueous composition comprises (a) an acrylic copolymer comprising structural units of an ethylenically unsaturated acetoacetyl functional monomer and (b) a specific multihydroxy-functional amine, which can provide good formaldehyde abatement property and reduced yellowing.

11 Claims, No Drawings

AQUEOUS COMPOSITION

FIELD OF THE INVENTION

The present invention relates to an aqueous composition comprising an acetoacetyl functional acrylic copolymer and a multihydroxy-functional amine.

INTRODUCTION

Aqueous polymer dispersions (also known as waterborne polymer dispersions) are becoming increasingly more important than solvent-based polymer dispersions for less environmental problems. There are increasingly strict environmental regulations with respect to reduce health risks from indoor exposure to air pollutants such as formaldehyde. Attempts have been made to reduce free formaldehyde released from the indoor environment. For example, aqueous acetoacetyl-group-containing polymer binders have been developed as formaldehyde abatement materials for coating applications. However, hydrolysis of the acetoacetyl groups in the polymer tends to occur in water during storage, which can cause a buildup of pressure in containers resulting in safety issues. In addition, coating compositions comprising these types of polymers after storage, particularly upon heat aging, tend to provide coating films with discoloration (e.g., yellowing).

It is desirable to discover an aqueous polymer composition that can be used in coating applications without the aforementioned problems.

SUMMARY OF THE INVENTION

The present invention solves the problem of discovering an aqueous composition that can be used in coating applications without the aforementioned problems. The aqueous composition of the present invention comprises a novel combination of an acetoacetyl functional acrylic copolymer and a specific amount of a multihydroxy-functional amine. The aqueous composition can provide films made therefrom with reduced yellowing without compromising other properties including formaldehyde abatement.

In a first aspect, the present invention is an aqueous composition comprising:

(a) an acrylic copolymer comprising, by weight based on the weight of the acrylic copolymer, from 1% to 10% of structural units of an ethylenically unsaturated acetoacetyl functional monomer; and (b) from 0.11% to 0.9% of a multihydroxy-functional amine, by weight based on the weight of the acrylic copolymer, having the structure of formula (I):

(I)

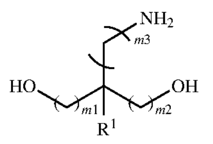

where $R^1$ is hydrogen, an alkyl group with from 1 to 10 carbon atoms, or $-(CH_2)_x-OH$, where x is from 1 to 5; $m_1$ and $m_2$ are each independently from 1 to 10; and $m_3$ is from 0 to 10.

In a second aspect, the present invention is a method of reducing yellowing of a coating made from an aqueous composition comprising an acrylic copolymer. The method comprises incorporating in the aqueous composition from 0.11% to 0.9% of a multihydroxy-functional amine, by weight based on the weight of the acrylic copolymer;

wherein the acrylic copolymer comprises, by weight based on the weight of the acrylic copolymer, from 1% to 10% of structural units of an ethylenically unsaturated acetoacetyl functional monomer; and wherein the multihydroxy-functional amine has the structure of formula (I):

(I)

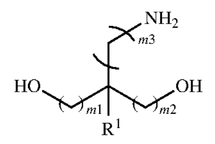

where $R^1$ is hydrogen, an alkyl group with from 1 to 10 carbon atoms, or $-(CH_2)_x-OH$, where x is from 1 to 5; $m_1$ and $m_2$ are each independently from 1 to 10; and $m_3$ is from 0 to 10.

DETAILED DESCRIPTION OF THE INVENTION

"Aqueous" composition or dispersion herein means that particles dispersed in an aqueous medium. By "aqueous medium" herein is meant water and from 0 to 30%, by weight based on the weight of the medium, of water-miscible compound(s) such as, for example, alcohols, glycols, glycol ethers, glycol esters, or mixtures thereof.

"Glass transition temperature" or "Tg" as used herein can be measured by various techniques including, for example, differential scanning calorimetry ("DSC") or calculation by using a Fox equation. The particular values of $T_g$ reported herein are those calculated by using the Fox equation (T. G. Fox, Bull. Am. Physics Soc., Volume 1, Issue No. 3, page 123 (1956)). For example, for calculating the $T_g$ of a copolymer of monomers $M_1$ and $M_2$, $$\frac{1}{T_g(calc)} = \frac{w(M_1)}{T_g(M_1)} + \frac{w(M_2)}{T_g(M_2)},$$

wherein $T_g$(calc.) is the glass transition temperature calculated for the copolymer, $w(M_1)$ is the weight fraction of monomer $M_1$ in the copolymer, $w(M_2)$ is the weight fraction of monomer $M_2$ in the copolymer, $T_g(M_1)$ is the glass transition temperature of the homopolymer of monomer $M_1$, and $T_g(M_2)$ is the glass transition temperature of the homopolymer of monomer $M_2$, all temperatures being in K. The glass transition temperatures of the homopolymers may be found, for example, in "Polymer Handbook", edited by J. Brandrup and E. H. Immergut, Interscience Publishers.

"Structural units", also known as "polymerized units", of the named monomer, refers to the remnant of the monomer after polymerization, that is, polymerized monomer or the monomer in polymerized form. For example, a structural unit of methyl methacrylate is as illustrated:

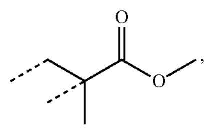

where the dotted lines represent the points of attachment of the structural unit to the polymer backbone.

The aqueous composition of the present invention comprises (a) one or more acrylic copolymer and (b) one or more multihydroxy-functional amine. "Acrylic copolymer" herein refers to a copolymer of an acrylic monomer with a different acrylic monomer or other monomers such as styrene. "Acrylic monomer" as used herein may include, for example, (meth)acrylic acid, alkyl (meth)acrylate, (meth) acrylamide, (meth)acrylonitrile and their modified forms such as hydroxyalkyl (meth)acrylate. Throughout this document, the word fragment "(meth)acryl" refers to both "methacryl" and "acryl". For example, (meth)acrylic acid refers to both methacrylic acid and acrylic acid, and methyl (meth) acrylate refers to both methyl methacrylate and methyl acrylate.

The acrylic copolymer (a) useful in the present invention is an acetoacetyl functional acrylic copolymer. The acrylic copolymer comprises structural units of one or more ethylenically unsaturated acetoacetyl functional monomer (i.e., a monomer with one or more acetoacetyl functional group). The acetoacetyl functional group herein can be represented by:

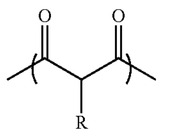

wherein R is hydrogen, or alkyl having 1 to 10 carbon atoms, or phenyl.

The ethylenically unsaturated acetoacetyl functional monomer can be an ethylenically unsaturated acetoacetoxy or acetoacetamide functional monomer. Examples of suitable acetoacetoxy or acetoacetamide functional groups include

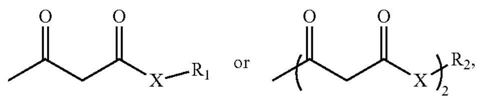

wherein X is O or N, $R_1$ is a divalent radical and $R_2$ is a trivalent radical, that attach the acetoacetoxy or acetoacetamide functional group to the backbone of the acrylic copolymer.

Suitable ethylenically unsaturated acetoacetyl functional monomers may include, for example, acetoacetoxyalkyl (meth)acrylates such as acetoacetoxyethyl methacrylate (AAEM), acetoacetoxyethyl acrylate, acetoacetoxypropyl methacrylate, acetoacetoxybutyl methacrylate, and 2,3-di (acetoacetoxy)propyl methacrylate; allyl acetoacetate; acetoacetamidoalkyl (meth)acrylates such as acetoacetamidoethyl methacrylate and acetoacetamidoethyl acrylate; or combinations thereof.

The acrylic copolymer useful in the present invention may comprise, by weight based on the weight of the acrylic copolymer, structural units of the ethylenically unsaturated acetoacetyl functional monomer in an amount of 1% or more, 1.5% or more, 2% or more, 2.5% or more, 3% or more, 3.5% or more, or even 4% or more, and at the same time, 10% or less, 9.5% or less, 9% or less, 8.5% or less, 8% or less, 7.5% or less, 7% or less, 6.5% or less, 6% or less, 5.5% or less, or even 5% or less.

The acrylic copolymer useful in the present invention may further comprise structural units of one or more monoethylenically unsaturated ionic monomer. The term "ionic monomer" herein refers to a monomer that bears an ionic charge between pH=1-14. The monoethylenically unsaturated ionic monomers may include, for example, carboxylic acid monomers, phosphorous-containing acid monomers, sulfonic acid monomers, sulfate monomers; salts thereof; or mixtures thereof. The carboxylic acid monomers can be $\alpha$, $\beta$-ethylenically unsaturated carboxylic acids, monomers bearing an acid-forming group which yields or is subsequently convertible to, such an acid group (such as anhydride, (meth)acrylic anhydride, or maleic anhydride); or mixtures thereof. Specific examples of carboxylic acid monomers include acrylic acid, methacrylic acid, maleic acid, itaconic acid, crotonic acid, fumaric acid, or mixtures thereof. The sulfonic acid monomers and salts thereof may include sodium vinyl sulfonate (SVS), sodium styrene sulfonate (SSS), acrylamido-methyl-propane sulfonate (AMPS), or mixtures thereof. Suitable phosphorous-containing acid monomers and salts thereof may include, for example, phosphoalkyl (meth)acrylates such as phosphoethyl (meth)acrylate, phosphopropyl (meth)acrylate, phosphobutyl (meth)acrylate, salts thereof, or mixtures thereof; $CH_2{=}C(R_p){-}C(O){-}O{-}(R_qO)_n{-}P(O)(OH)_2$, wherein $R_p{=}H$ or $CH_3$, $R_q$=alkylene, such as an ethylene group, a propylene group, a butylene group, or a combination thereof; and n=1-20, such as SIPOMER PAM-100, SIPOMER PAM-200, SIPOMER PAM-300, SIPOMER PAM-600 and SIPOMER PAM-4000 all available from Solvay; phosphoalkoxy (meth)acrylates such as phospho ethylene glycol (meth)acrylate, phospho di-ethylene glycol (meth)acrylate, phospho tri-ethylene glycol (meth)acrylate, phospho propylene glycol (meth)acrylate, phospho dipropylene glycol (meth)acrylate, phospho tri-propylene glycol (meth)acrylate, salts thereof, or mixtures thereof. Preferred phosphorus-containing acid monomer is phosphoethyl methacrylate (PEM). The acrylic copolymer may comprise, by weight based on the weight of the acrylic copolymer, from 0.05% to 10%, from 0.3% to 8%, from 0.5% to 5%, or from 1% to 3% of structural units of the monoethylenically unsaturated ionic monomer.

The acrylic copolymer useful in the present invention may comprise structural units of one or more monoethylenically unsaturated nonionic monomer that is other than the ethylenically unsaturated acetoacetyl functional monomer. The term "nonionic monomer" herein refers to a monomer that does not bear an ionic charge between pH=1-14. Monoethylenically unsaturated nonionic monomers may include $C_1$-$C_{20}$, $C_1$-$C_{10}$, or $C_1$-$C_8$-alkyl esters of (meth)acrylic acid. Examples of suitable monoethylenically unsaturated nonionic monomers include methyl acrylate, methyl methacrylate, ethyl acrylate, butyl acrylate, 2-ethylhexyl acrylate, decyl acrylate, lauryl acrylate, butyl methacrylate, isodecyl methacrylate, lauryl methacrylate, hydroxy-functional alkyl (meth)acrylates such as hydroxyethyl (meth)acrylate and hydroxypropyl (meth)acrylate; (meth)acrylamide; (meth) acrylonitrile; ureido-functional monomers such as hydroxyethyl ethylene urea methacrylate; cycloalkyl (meth)acrylates such as cyclohexyl (meth)acrylate, methcyclohexyl acrylate, isobornyl (meth)acrylate, and dihydrodicyclopentadienyl acrylate; monomers bearing carbonyl-containing groups such as diacetone acrylamide (DAAM); vinyl aromatic monomers including styrene and substituted styrene such as .alpha.-methyl styrene, p-methyl styrene, t-butyl styrene, vinyltoluene, or mixtures thereof; vinyltrialkoxysilanes such as vinyltrimethoxysilane, vinyltriethoxysilane, and vinyltris (2-methoxyethoxy)silane, vinyldimethylethoxysilane, and vinylmethyldiethoxysilane; (meth)acryl functional silanes including, for example, (meth)acryloxyalkyltrialkoxysilanes such as gamma-methacryloxypropyltrimethoxy silane and methacryloxypropyltriethoxysilane; 3-methacryloxypropylmethyldimethoxysilane; 3-methacryloxypropyltrimethoxy silane; and 3-methacryloxypropyltriethoxysilane; $\alpha$-olefins such as ethylene, propylene, and 1-decene; vinyl acetate, vinyl butyrate, vinyl versatate and other vinyl esters; glycidyl (meth)acrylate; or combinations thereof. Preferred ethylenically unsaturated nonionic monomers are butyl acrylate, butyl methacrylate, methyl methacrylate, ethyl acrylate, 2-ethylhexyl acrylate, vinyltrimethoxysilane, styrene, or mixtures thereof. The acrylic copolymer may comprise, by weight based on the weight of the acrylic copolymer, from 80% to 98.9%, from 85% to 96%, or from 90% to 95%, of structural units of the monoethylenically unsaturated nonionic monomer.

The acrylic copolymer useful in the present invention may optionally comprise structural units of one or more multiethylenically unsaturated monomer including di-, tri-, tetra-, or higher multifunctional ethylenically unsaturated monomers. Suitable multiethylenically unsaturated monomers may include, for example, allyl (meth)acrylate, diallyl phthalate, divinyl benzene, ethylene glycol dimethacrylate, butylene glycol dimethacrylate, or mixtures thereof. The acrylic copolymer may comprise structural units of the multiethylenically unsaturated monomer in an amount of zero or more, 0.05% or more, or even 0.1% or more, and at the same time, 5% or less, 3% or less, 1% or less, or even 0.5% or less, by weight based on the weight of the acrylic copolymer.

Types and levels of the monomers described above may be chosen to provide the acrylic copolymer with a Tg suitable for different applications. The Tg of the acrylic copolymer may be in the range of from −20 to 30 degrees Celsius (° C.), −15 to 20° C., from −10 to 15° C., or from −5 to 10° C., as calculated by the Fox equation.

The acrylic copolymer useful in the present invention may be prepared by free-radical polymerization, preferably emulsion polymerization, of the monomers described above. Total weight concentration of the monomers used for preparing the acrylic copolymer is equal to 100%. The monomers may be added neat or as an emulsion in water; or added in one or more additions or continuously, linearly or nonlinearly, over the reaction period of preparing the acrylic copolymer. Temperature suitable for polymerization process may be lower than 100° C., in the range of from 30 to 95° C., or in the range of from 50 to 90° C. One or more surfactants may be used in preparing the acrylic copolymer. The surfactant may be added prior to, during, or after the polymerization of the monomers, or combinations thereof. These surfactants may include anionic and/or nonionic emulsifiers, such as, for example, phosphate surfactants, sulfates surfactants, sulfonates surfactants and succinates surfactants, polymerizable surfactants, or mixtures thereof. The surfactant used is usually from zero to 5%, from 0.5% to 3%, or from to 2%, by weight based on the total weight of monomers used for preparing the acrylic copolymer.

In the polymerization process, free radical initiators and/or chain transfer agents may be used. The polymerization process may be thermally initiated or redox initiated free-radical polymerization. Examples of suitable free radical initiators include hydrogen peroxide, t-butyl hydroperoxide, cumene hydroperoxide, ammonium and/or alkali metal persulfates, sodium perborate, perphosphoric acid, and salts thereof; potassium permanganate, and ammonium or alkali metal salts of peroxydisulfuric acid. The free radical initiators may be used typically at a level of 0.01% to 3.0%, by weight based on the total weight of monomers. Redox systems comprising the above described initiators coupled with a suitable reductant may be used in the polymerization process. Examples of suitable reductants include sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, acetone bisulfite, glycolic acid, hydroxymethanesulfonic acid, glyoxylic acid hydrate, lactic acid, glyceric acid, malic acid, tartaric acid and salts of the proceeding acids. Metal salts of iron, copper, manganese, silver, platinum, vanadium, nickel, chromium, palladium, or cobalt may be used to catalyze the redox reaction. Chelating agents for the metals may optionally be used. Examples of suitable chain transfer agents include 3-mercaptopropionic acid, n-dodecyl mercaptan, methyl 3-mercaptopropionate, butyl 3-mercaptopropionate, benzenethiol, azelaic alkyl mercaptan, or mixtures thereof. The chain transfer agent may be used in an effective amount to control the molecular weight of the acrylic copolymer, for example, from zero to 1%, from 0.1% to 0.5%, or from 0.15% to 0.4%, by weight based on the total weight of monomers used for preparing the acrylic copolymer.

After completing the polymerization, the obtained acrylic copolymer dispersion may be neutralized by one or more bases as neutralizers in a sufficient amount to adjust a pH value, for example, from 6 to 10, from 7 to 10, or from 8 to 9.5. The bases may lead to partial or complete neutralization of the ionic or latently ionic groups of the acrylic copolymer. The base useful in the present invention may be selected from the group consisting of ammonia, a primary amine with less than 2 (<2) hydroxyl groups, an alkaline earth metal compound, or mixtures thereof. "Primary amine" refers to an amine containing one or more primary amine group ($—NH_2$). Examples of suitable primary amines include monoethanolamine, diethylene triamine, triethylene tetramine, tetraethylenepentamine, glycine, polyether amines such as JEFFAMINE D230 and D400 amines available from Huntsman Corporation, or mixtures thereof. Examples of suitable alkaline earth metal compound include sodium hydroxide, potassium hydroxide, calcium hydroxide, zinc oxide, magnesium oxide, sodium carbonate, or mixtures thereof. Preferred bases are primary amines. The primary amine may be present in an amount to provide a molar ratio of primary amine groups ($—NH_2$) to acetoacetyl functional groups in the acrylic copolymer in the range of from 0.3 to 1.5, from 0.4 to 1.4, from 0.5 to 1.3, from 0.6 to 1.2, from 0.7 to 1.2, from 0.8 to 1.1 or from 0.9 to 1.0.

The acrylic copolymer particles in the aqueous composition of the present invention may have a particle size of from 50 nanometers (nm) to 500 nm, from 80 nm to 200 nm, or from 90 nm to 150 nm. The particle size herein refers to Z-average size and may be measured by a Brookhaven BI-90 Plus Particle Size Analyzer.

The aqueous composition of the present invention further comprises one or more multihydroxy-functional amine having the structure of formula (I):

(I)

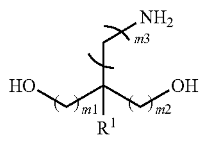

where $R^1$ is hydrogen, an alkyl group having from 1 to 10 carbon atoms, or $-(CH_2)_x-OH$, where x is from 1 to 5; $m_1$ and $m_2$ are each independently from 1 to 10; and $m_3$ is from 0 to 10.

$R^1$ can be an alkyl group having from 1 to 10 carbon atoms, from 1 to 8 carbon atoms, from 1 to 7 carbon atoms, or from 1 to 4 carbon atoms. The value of x can be from 1 to 5, from 1 to 4, from 1 to 3, or from 1 to 2. $m_1$ and $m_2$ may be each independently from 1 to 10, from 1 to 8, from 1 to 6, or from 1 to 5. $m_3$ can be from 0 to 10, from 0 to 8, from 0 to 5, or from 0 to 1. Preferably, $R^1$ is $-(CH_2)_x-OH$, where x is from 1 to 2.

Examples of suitable multihydroxy-functional amines include tris(hydroxymethyl)aminomethane (Tris-A,

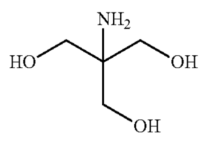

tris(hydroxymethyl)aminoethane

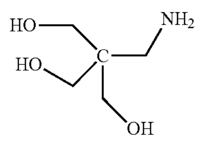

tris(hydroxyethyl)aminomethane

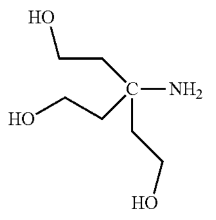 [SMILES: NC(CCO)(CCO)CCO]

2-amino-1,3-propanediol (APL,)

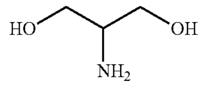

2-amino-2-ethyl-1,3-propanediol (AEPL,

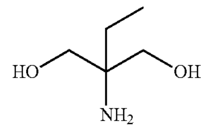

or mixtures thereof.

Preferably, the multihydroxy-functional amine is selected from the group consisting of tris(hydroxymethyl)aminomethane, 2-amino-1,3-propanediol, 2-amino-2-ethyl-1,3-propanediol, or mixtures thereof.

The multihydroxy-functional amine useful in the present invention can be included into the aqueous composition during and/or after the polymerization process for preparing the acrylic copolymer. Preferably, the functional amine is added after completing the polymerization process of preparing the acrylic copolymer, more preferably, after the addition of the neutralizer.

The aqueous composition of the present invention may comprise the multihydroxy-functional amine in an amount of 0.11% or more, 0.12% or more, 0.13% or more, 0.14% or more, 0.15% or more, 0.16% or more, 0.17% or more, 0.18% or more, 0.19% or more, 0.2% or more, 0.22% or more, 0.25% or more, 0.28% or more, 0.30% or more, 0.32% or more, 0.35% or more, 0.38% or more, or even 0.4% or more, and at the same time, 0.90% or less, 0.85% or less, 0.80% or less, 0.75% or less, 0.70% or less, 0.65% or less, 0.60% or less, 0.55% or less, or even 0.5% or less, by weight based on the weight of the acrylic copolymer.

The aqueous composition of the present invention is particularly useful for coating applications. The aqueous composition can be a coating composition and may further comprise a pigment, an extender, a defoamer, a thickener, a wetting agent, a dispersant, a coalescent, a biocide, or mixtures thereof.

The aqueous composition of the present invention may comprise one or more pigment. "Pigment" herein refers to a particulate inorganic material which is capable of materially contributing to the opacity or hiding capability of a coating. Such materials typically have a refractive index greater than 1.8. Inorganic pigments may include, for example, titanium dioxide ($TiO_2$), zinc oxide, iron oxide, zinc sulfide, barium sulfate, barium carbonate, or mixture thereof. In a preferred embodiment, pigment used in the present invention is $TiO_2$. $TiO_2$ typically exists in two crystal forms, anastase and rutile. $TiO_2$ may be also available in concentrated dispersion form.

The aqueous composition of the present invention may comprise one or more extender. The term "extender" herein refers to a particulate inorganic material having a refractive index of less than or equal to 1.8 and greater than 1.3. Examples of suitable extenders include calcium carbonate, clay, calcium sulfate, aluminosilicates, silicates, zeolites, mica, diatomaceous earth, solid or hollow glass, ceramic beads, nepheline syenite, feldspar, diatomaceous earth, calcined diatomaceous earth, talc (hydrated magnesium silicate), silica, alumina, kaolin, pyrophyllite, perlite, baryte, wollastonite, opaque polymers such as ROPAQUE™ Ultra E available from The Dow Chemical Company (ROPAQUE is a trademark of The Dow Chemical Company), or mixtures thereof.

The aqueous composition of the present invention may have a pigment volume concentration (PVC) of 8% or more, 10% or more, 20% or more, 30% or more, and at the same time, 80% or less, 65% or less, or even 5% or less. PVC may be determined by the equation: PVC=(Volume of pigment and extender/Dry volume of the aqueous composition) *100% The aqueous composition of the present invention may comprise one or more defoamer.

The term "defoamer" herein refer to a chemical additive that reduces and hinders the formation of foam. Defoamers may be silicone-based defoamers, mineral oil-based defoamers, ethylene oxide/propylene oxide-based defoamers, alkyl polyacrylates, or mixtures thereof. Suitable commercially available defoamers include, for example, TEGO Airex 902 W and TEGO Foamex 1488 polyether siloxane copolymer emulsions both available from TEGO, BYK-024 silicone deformer available from BYK, or mixtures thereof. The defoamer may be present in an amount of from zero to 2%, from 0.1% to 1.5%, or from 0.2% to 1%, by weight based on the total weight of the coating composition.

The aqueous composition of the present invention may comprise one or more thickener. Thickeners may include polyvinyl alcohol (PVA), clay materials, acid derivatives, acid copolymers, urethane associate thickeners (UAT), polyether urea polyurethanes (PEUPU), polyether polyurethanes (PEPU), or mixtures thereof. Examples of suitable thickeners include alkali swellable emulsions (ASE) such as sodium or ammonium neutralized acrylic acid polymers; hydrophobically modified alkali swellable emulsions (HASE) such as hydrophobically modified acrylic acid copolymers; associative thickeners such as hydrophobically modified ethoxylated urethanes (HEUR); and cellulosic thickeners such as methyl cellulose ethers, hydroxymethyl cellulose (HMC), hydroxyethyl cellulose (HEC), hydrophobically-modified hydroxy ethyl cellulose (HMHEC), sodium carboxymethyl cellulose (SCMC), sodium carboxymethyl 2-hydroxyethyl cellulose, 2-hydroxypropyl methyl cellulose, 2-hydroxyethyl methyl cellulose, 2-hydroxybutyl methyl cellulose, 2-hydroxyethyl ethyl cellulose, and 2-hydroxypropyl cellulose. Preferably, the thickener is a hydrophobically-modified hydroxy ethyl cellulose (HMHEC). The thickener may be present in an amount of from zero to 4%, from 0.2% to 3%, or from 0.4% to 2%, by dry weight based on the total weight of the aqueous composition.

The aqueous composition of the present invention may comprise one or more wetting agent. The term "wetting agent" herein refers to a chemical additive that reduces the surface tension of a coating composition, causing the coating composition to more easily spread across or penetrate the surface of a substrate. Wetting agents may be polycarboxylates, anionic, zwitterionic, or non-ionic. The wetting agent may be present in an amount of from zero to 3%, from 0.1% to 2.5%, or from 0.2% to 2%, by weight based on the total weight of the aqueous composition.

The aqueous composition of the present invention may comprise one or more dispersant. Dispersants may include nonionic, anionic, or cationic dispersants such as polyacids with suitable molecular weight, 2-amino-2-methyl-1-propanol (AMP), dimethyl amino ethanol (DMAE), potassium tripolyphosphate (KTPP), trisodium polyphosphate (TSPP), citric acid and other carboxylic acids. The polyacids used may include homopolymers and copolymers based on polycarboxylic acids (e.g., weight average molecular weight ranging from 1,000 to less than grams per mole (g/mol) as measured by gel permeation chromatography (GPC) analysis), including those that have been hydrophobically- or hydrophilically-modified, e.g., polyacrylic acid or polymethacrylic acid or maleic anhydride with various monomers such as styrene, acrylate or methacrylate esters, diisobutylene, and other hydrophilic or hydrophobic comonomers; salts of thereof; or mixtures thereof. The dispersant may be present in an amount of from zero to 3%, from 0.1% to 2%, from 0.2% to 1.5%, or from 0.3% to 1.2%, by dry weight based on the total weight of the aqueous composition.

The aqueous composition of the present invention may comprise one or more coalescent. The term "coalescent" herein refers to a slow-evaporating solvent that fuses polymer particles into a continuous film under ambient condition. Examples of suitable coalescents include 2-n-butoxyethanol, dipropylene glycol n-butyl ether, propylene glycol n-butyl ether, dipropylene glycol methyl ether, propylene glycol methyl ether, propylene glycol n-propyl ether, diethylene glycol monobutyl ether, ethylene glycol monobutyl ether, ethylene glycol monohexyl ether, triethylene glycol monobutyl ether, dipropylene glycol n-propyl ether, n-butyl ether, or mixtures thereof. Preferably, the coalescent includes dipropylene glycol n-butyl ether, ethylene glycol monobutyl ether, diethylene glycol monobutyl ether, n-butyl ether, or mixtures thereof. The coalescent may be present in an amount of from zero to 30%, from 0.1% to 20%, or from 0.5% to 15%, by weight based on the total weight of the aqueous composition.

In addition to the components described above, the aqueous composition of the present invention may further comprise any one or combination of the following additives: buffers, neutralizers, photo crosslinkers, anti-freezing agents, humectants, mildewcides, biocides, anti-skinning agents, colorants, flowing agents, anti-oxidants, plasticizers, leveling agents, thixotropic agents, adhesion promoters, and grind vehicles. These additives may be present in a combined amount of from zero to 5%, from 0.1% to 4%, or from 0.5% to 3%, by weight based on the total weight of the aqueous composition.

The aqueous composition of the present invention may have a solids content of from 30% to 80%, from 40% to 70%, from 50% to 60%, by weight based on the total weight of the aqueous composition.

The aqueous coating composition of the present invention may be prepared by adding the multihydroxy-functional amine during and/or after the polymerization process for preparing the acrylic copolymer, and optionally mixing with other optional components above. Preferably, the aqueous coating composition is prepared by admixing the multihydroxy-functional amine with the acrylic copolymer. Components in the aqueous composition may be mixed in any order to provide the aqueous composition of the present invention. Any of the above-mentioned optional components may also be added to the aqueous composition during or prior to the mixing to form the aqueous composition.

The aqueous composition of the present invention can be applied to, and adhered to, various substrates. Examples of suitable substrates include wood, metals, plastics, foams, stones, elastomeric substrates, glass, fabrics, concrete, or cementitious substrates. The aqueous composition, preferably comprising the pigment, is suitable for various applications such as marine and protective coatings, automotive coatings, traffic paint, Exterior Insulation and Finish Systems (EIFS), roof mastic, wood coatings, coil coatings, plastic coatings, powder coatings, can coatings, architectural coatings, and civil engineering coatings, particularly suitable for architectural coatings. The aqueous composition can be applied to a substrate by incumbent means including brushing, dipping, rolling and spraying, preferably by spraying. The standard spray techniques and equipment for spraying such as air-atomized spray, air spray, airless spray, high volume low pressure spray, and electrostatic spray such as electrostatic bell application, and either manual or automatic methods can be used. After the aqueous composition has been applied to a substrate, the aqueous composition can dry, or allow to dry, to form a film (that is, coating) at room temperature (20-25° C.), or at an elevated temperature, for example, from 35° C. to 80° C.

The aqueous composition of the present invention after heat aging at 65° C. for 1 month can provide a film made therefrom with less yellowing, as compared with a similar aqueous composition only lacking the multihydroxy-functional amine (hereinafter "Incumbent Aqueous Composition") after heat aging at 65° C. for 1 month. The aqueous composition of the present invention can provide the film made therefrom and the resultant coated substrate with reduced or low yellowness. "Reduced or low yellowness" or "reduced or low yellowing" means that difference of b values (i.e., delta b) no greater than 0.6 for the aqueous composition before and after heat aging at 65° C. for 1 month, preferably, delta b no greater than 0.5. The yellowing performance can be determined according to the test method described in the Examples section below.

The present invention also provides a method of reducing yellowing of a coating made from an aqueous composition comprising the acrylic copolymer (i.e., "Incumbent Aqueous Composition"), comprising: incorporation in the aqueous composition the multihydroxy-functional amine, for example, admixing the multihydroxy-functional amine with the acrylic copolymer. The film can be made by drying the aqueous composition as described above. "Reducing yellowing" herein means the aqueous composition comprising the combination of the acrylic copolymer and the multihydroxy-functional amine after 1 month of heat aging at 65° C. provided coatings made therefrom with the reduced yellowing above, as compared with the Incumbent Aqueous Composition only lacking the multihydroxy-functional amine) after 1 month of heat aging at 65° C.

The present invention also includes a method of removing aldehydes from air containing aldehydes with the aqueous composition of the present invention, comprising: applying the aqueous composition to a substrate; and drying, or allowing to dry, the applied aqueous composition to form a film. The substrate and drying conditions are as described above. The aqueous composition of the present invention can also provide good formaldehyde abatement properties to pass the requirement of JC/T 1074-2008 (China building materials industry standard for purificatory performance of coatings with air purification), for example, showing formaldehyde abatement efficiency ≥75%, preferably, 80% or more, or even 84% or more.

EXAMPLES

Some embodiments of the invention will now be described in the following Examples, wherein all parts and percentages are by weight unless otherwise specified.

Styrene (ST), butyl acrylate (BA), and methacrylic acid (MAA) are available from The Dow Chemical Company.

Acetoacetoxyethyl methacrylate (AAEM) is available from Eastman.

Sodium p-styrene sulfonate (SSS), ethylene diamine tetraacetic acid (EDTA) tetrasodium salt, tert-butyl hydroperoxide (t-BHP), monoethanolamine (MEA), Tris(hydroxymethyl)aminomethane (Tris-A), 2-amino-1,3-propanediol (APL), and 2-amino-2-ethyl-1,3-propanediol (AEPL) are available from Sinopharm Chemical Reagent Co., Ltd.

POLYSTEP P-12A alkyl ethoxylated phosphate ammonium salt is available from Stepan.

DISPONIL Fes-32 alkyl ethoxylated sulfate sodium salt is available from BASF.

Bruggolite FF6M (FF-6) is available from Brueggemann Chemical.

The following standard analytical equipment and methods are used in the Examples and in determining the properties and characteristics stated herein:

Formaldehyde Abatement Efficiency

A paint formulation was evaluated for formaldehyde (FA) abatement efficiency properties according to JC/T1074-2008 standard. FA efficiency requires ≥75% after 24 hours to meet the requirement of JC/T 1074-2008. The higher FA efficiency, the better FA abatement.

Yellowing Resistance Test

A portion of a paint formulation sample was applied to a LENETA Form 2A opacity chart by a 100 microns (μm) drawdown bar and dried at room temperature overnight. Then, b value of the resulting coating film, denoted as "$b_{Initial}$", was measured by a colorimeter (Spectro-guide sphere model from BYK).

Then another portion of the paint formulation sample was placed in an oven at 65° C. After heat aging at 65° C. for 1 month, the sample was taken out and allowed to cool to room temperature. The resulting paint formulation was further applied on a LENETA Form 2A opacity chart with a 100 μm drawdown bar and dried at room temperature overnight. Then the b value of the obtained coating film, denoted as "$b_{Final}$", was measured by the colorimeter. Delta b value (Δb) is determined by the equation: $\Delta b = b_{Final} - b_{Initial}$. Lower Δb value indicates less yellowing of the coating film. Acceptable yellowing performance is Ab value no greater than 0.6 (≤0.6) after 1 month of heat aging the paint formulation at 65° C.

Solids Content

Solids content of an aqueous composition sample was measured by weighting 0.7±0.1 g of the sample (wet weight of the sample is denoted as "W1"), putting the sample into an aluminum pan (weight of aluminum pan is denoted as "W2") in an oven at 150° C. for 25 minutes (min), and then cooling to room temperature and weighting the aluminum pan with the dried sample with the total weight denoted as "W3". "W3−W2" refers to dry or solids weight of the sample. Solids content is calculated by (W3−W2)/W1*100%.

Comparative Example (Comp Ex) A Preparation of Acetoacetyl Functional Acrylic Copolymer A A monomer emulsion was prepared by mixing deionized (DI) water (308.3 grams (g)), P-12A (25% active, 97.19 g), SSS (8.59 g), MAA (31.76 g), BA (927.44 g), ST (552.77 g), and AAEM (31.6 g). A one gallon stirred reactor was charged with DI water (837 g) and Fes-32 (32% active, 5.5 g). After the reactor contents were heated to 91° C., a solution of sodium carbonate (1.56 g sodium carbonate in 18 g DI water), the monomer emulsion (48.6 g), and a solution of ammonium persulfate (APS) (4.7 g APS in 16 g DI water) were charged to the reactor. When the temperature reached 88° C., the remainder of the monomer emulsion and another solution of APS (1.6 g APS in 54 g DI water) were added gradually over 90 min. The reactor temperature was maintained at 88° C. DI water (38 g) was used to rinse the monomer emulsion feed line to the reactor. The reactor was cooled to 70° C. and then $FeSO_4 \cdot 7H_2O$ (0.013 g) and a solution of EDTA tetrasodium salt (0.02 g EDTA tetrasodium salt in 6 g DI water) were added into the reactor. A solution of t-BHP (3.81 g t-BHP (70% active) in 66 g DI water) and a solution of FF-6 (1.9 g FF-6 in 69 g water) were fed into the reactor over 30 min with agitation. When the reactor temperature reached 50° C., a neutralizer solution (1.05 g NaOH in 28 g water and 8.92 g MEA in 17 g water) was fed into the reactor over 30 min to adjust pH value of the contents of the reactor (i.e., neutralization step). The contents of the reactor were filtered through a 100 mesh (45 μm) filter to get the final aqueous composition with a solids content of 47.1% and a pH value of 9.0.

Comp Ex B

Comp Ex B was carried out according to the procedure for preparation of the acrylic copolymer in Comp Ex A above, except (i) a monomer emulsion used in Comp Ex B was prepared by mixing DI water (308.3 g), P-12A (25% active, 97.19 g), SSS (8.59 g), MAA (31.76 g), BA (896.01 g), and ST (615.58 g); and (ii) after the neutralization step, a solution of Tris-A (9.3 g Tris-A in 11 g water) was further fed into the reactor under agitation. The contents of the reactor were filtered through a 100 mesh (45 μm) filter to get the final aqueous composition of Comp Ex B with a solids content of 46.5% and a pH value of 9.4.

Comp Ex C

Comp Ex C was carried out according to the procedure for preparation of the acrylic copolymer in Comp Ex A above, except a solution of APL (1.55 g APL in 2 g water) was further added into the reactor under agitation after the neutralization step. The contents of the reactor were filtered through a 100 mesh (45 μm) filter to get the final aqueous composition in Comp Ex C with a solids content of 46.8% and a pH value of 9.1.

Comp Ex D

Comp Ex D was carried out according to the procedure for preparation of the acrylic copolymer in Comp Ex A above, except a solution of APL (15.5 g APL in 18 g water) was further added into the reactor under agitation after the neutralization step. The contents of the reactor were filtered through a 100 mesh (45 μm) filter to get the final aqueous composition in Comp Ex D with a solids content of 47.0% and a pH value of 9.7.

Comp Ex E

Comp Ex E was carried out according to the procedure for preparation of the acrylic copolymer in Comp Ex A above, except a solution of MEA (4.65 g MEA in 5.4 g water) was further added into the reactor under agitation after the neutralization step. The contents of the reactor were filtered through a 100 mesh (45 μm) filter to get the final aqueous composition in Comp Ex E with a solids content of 47.1% and a pH value of 9.4.

Example (Ex) 1

Ex 1 was carried out according to the procedure for preparation of the acrylic copolymer in Comp Ex A above, except a solution of Tris-A (8.53 g Tris-A in 10 g water) was further added into the reactor under agitation after the neutralization step. The contents of the reactor were filtered through a 100 mesh (45 μm) filter to get the final aqueous composition in Ex 1 with a solids content of 47.2% and a pH value 9.5.

Ex 2

Ex 2 was carried out according to the procedure for preparation of the acrylic copolymer in Comp Ex A above, except a solution of APL (2.32 g APL in 3 g water) was further added into the reactor under agitation after the neutralization step. The contents of the reactor were filtered through a 100 mesh (45 μm) filter to get the final aqueous composition in Ex 2 with a solids content of 47.1% and a pH value of 9.1.

Ex 3

Ex 3 was carried out according to the procedure for preparation of the acrylic copolymer in Comp Ex A above, except a solution of APL (3.10 g APL in 4 g water) was further added into the reactor under agitation after the neutralization step. The contents of the reactor were filtered through a 100 mesh (45 μm) filter to get the final aqueous composition in Ex 3 with a solids content of 47.0% and a pH value of 9.3.

Ex 4

Ex 4 was carried out according to the procedure for preparation of the acrylic copolymer in Comp Ex A above, except a solution of APL (4.65 g APL in 5 g water) was further added into the reactor under agitation after the neutralization step. The contents of the reactor were filtered through a 100 mesh (45 μm) filter to get the final aqueous composition in Ex 4 with a solid content of 47.1% and a pH value of 9.4.

Ex 5

Ex 5 was carried out according to the procedure for preparation of the acrylic copolymer in Comp Ex A above, except a solution of APL (8.53 g APL in 10 g water) was further added into the reactor under agitation after the neutralization step. The contents of the reactor were filtered through a 100 mesh (45 μm) filter to get the final aqueous composition in Ex 5 with a solids content of 47.3% and a pH value of 9.5.

Ex 6

Ex 6 was carried out according to the procedure for preparation of the acrylic copolymer in Comp Ex A above, except a solution of APL (10.86 g APL in 14 g water) was further added into the reactor under agitation after the neutralization step. The contents of the reactor were filtered through a 100 mesh (45 μm) filter to get the final aqueous composition in Ex 6 with a solids content of 47.3% and a pH value of 9.6.

Ex 7

Ex 7 was carried out according to the procedure for preparation of the acrylic copolymer in Comp Ex A above, except a solution of APL (12.41 g APL in 16 g water) was further added into the reactor under agitation after the neutralization step. The contents of the reactor were filtered through a 100 mesh (45 μm) filter to get the final aqueous composition in Ex 7 with a solids content of 47.2% and a pH value of 9.6.

Ex 8

Ex 8 was carried out according to the procedure for preparation of the acrylic copolymer in Comp Ex A above, except a solution of APL (13.97 g APL in 18 g water) was further added into the reactor under agitation after the neutralization step. The contents of the reactor were filtered through a 100 mesh (45 μm) filter to get the final aqueous composition in Ex 8 had a solids content of 47.2% and a pH value of 9.7.

Ex 9

Ex 9 was carried out according to the procedure for preparation of the acrylic copolymer in Comp Ex A above, except a solution of AEPL (4.65 g AEPL in 6.04 g water) was further added into the reactor under agitation after the neutralization step. The contents of the reactor were filtered through a 100 mesh (45 μm) filter to get the final aqueous composition in Ex 9 with a solids content of 47.2% and a pH value of 9.3.

Ex 10

Ex 10 was carried out according to the procedure for preparation of the acrylic copolymer in Comp Ex A above, except the monomer emulsion and the neutralizer solution used in Ex 10 are different and a certain amount of multi-hydroxy-functional amine was further added in Ex 10 as follows:

The monomer emulsion was prepared by mixing DI water (308.3 g), P-12A (25% active, 97.19 g), SSS (8.59 g), MAA (31.76 g), BA (911.64 g), ST (536.97 g), and AAEM (63.2 g).

The neutralizer solution used in the neutralizer step was a solution of 1.05 g NaOH in 28 g water and 17.84 g MEA in 17 g water. After the neutralization step, a solution of Tris-A (8.53 g Tris-A in 16 g water) was further added into the reactor under agitation.

The contents of the reactor were filtered through a 100 mesh (45 μm) filter to get the final aqueous composition in Ex 10 with a solids content of 47.3% and a pH value of 9.3.

Paint Formulations

The above obtained aqueous compositions were used as binders for preparing paint formulations, based on formulations given in Table 1. Ingredients in the grind stage were mixed using a high speed Cowles disperser at a speed of 1,000-1,300 revolutions per minute (rpm). Then ingredients in the letdown stage were added and mixed by a conventional agitator at a speed of 500 rpm. The binder was added in an amount to keep the solids weight of the binder in each paint formulation the same (solids weight of a binder can be calculated by: (wet weight of the binder*solids content of the binder)). The amount of water added in each coating composition was adjusted to make the total amount of the paint formulation equal to 1,000 g. Types of the binder in each paint formulation are given in Table 1. Properties of the resultant paint formulations were evaluated according to the test methods described above and results are given in Table 2.

TABLE 1

Paint Formulation of Comp Paint A

| Material | Supplier | gram |
|---|---|---|
| Grind stage | | |
| Water | | 141.5 |
| Natrosol 250 HBR hydroxyethyl cellulose (HEC) thickener | Ashland Company | 2.0 |
| NaOH (15%) | Chemical Reagent Co., Ltd. | 1.0 |
| TERGITOL ™ EF-406 alcohol ethoxylates surfactant (70%) | The Dow Chemical Company | 2.0 |
| OROTAN ™ 1288 dispersant (45%) | The Dow Chemical Company | 6.0 |
| Nopco NXZ nonionic silicon oil defoamer | San Nopco Ltd. | 1.0 |
| Ti-Pure R-706 titanium dioxide | DuPont | 220.0 |
| Celite 499 extender | Celite Corporation | 10.0 |
| CC-700 calcium carbonate | Guangfu Building Materials Group (China) | 60.0 |
| ASP-170 hydrous kaolin | BASF | 60.0 |
| DB-80 Calcined clay | Guangfu Building Materials Group (China) | 80.0 |
| Sub-Total | | 583.5 |
| Letdown stage | | |
| Binder (Comp Ex A) | | 330.0 |
| ROPAQUE ™ Ultra E Opaque polymer (30%) | The Dow Chemical Company | 40.0 |
| Nopco NXZ nonionic silicon oil defoamer | San Nopco Ltd. | 2.0 |
| ACRYSOL ™ TT-935 associative rheology modifier (50%) | The Dow Chemical Company | 5.0 |
| NaOH (15%) | | 0.5 |
| ZPT38 Zinc pyrithione biocide (38%) | Troy Corporation | 3.0 |
| 2.5% 2-methyl-4-isothiazolin-3-one (MIT) biocide | Lanxess | 4.0 |
| 2.5% 1,2-benzisothiazolin-3-one (BIT) biocide | Lanxess | 4.0 |
| Water | | 28.0 |
| Total | | 1000.0 |

*OROTAN, ACRYSOL, and TERGITOL are trademarks of The Dow Chemical Company.

As shown in Table 2, the binder of Comp Ex A comprising only the acetoacetyl functional copolymer (2% AAEM) without a multihydroxy-functional amine provided Paint A with unacceptable yellowing. Paint B made from the binder of Comp Ex B comprising Tris-A but in the absence of an acetoacetyl functional polymer couldn't pass the FA efficiency requirement. The binder of Comp Ex D comprising a combination of 1% APL with the acetoacetyl functional copolymer (2% AAEM) provided Paint D with unacceptable yellowing, as indicated by high Δb value (>0.6). Combining 0.1% APL or MEA with the acetoacetyl functional copolymer (Comp Exs C and E) resulted in Paint C or E with more severe yellowing than Paint A.

As compared with the binder of Comp Ex A, the binder of Ex 1 comprising the combination of Tris-A with the acetoacetyl functional copolymer (2% AAEM) provided Paint 1 with significantly reduced yellowing. In addition, the binders combining such acetoacetyl functional copolymer with specific amounts of APL (Exs 2-8) or AEPL (Ex 9) also provided Paints 2-9 with no significant yellowing. The binder of Ex 10 combining Tris-A with the acetoacetyl functional copolymer (4% AAEM) also provided Paint 10 with acceptable degree of yellowing. Moreover, Paints 1-6 and 9-10 demonstrated even less yellowing than Paints 7-8. All the inventive paint formulations (Paints 1-10) also passed the requirement of JC/T1074-2008 for FA efficiency.

TABLE 2

Paint formulations and properties

| Paint | Binder type | Binder main composition[1] | FA efficiency[2] (Properties) | Δb[3] (Properties) |
|---|---|---|---|---|
| Comp Paint A | Comp Ex A | Acrylic copolymer A (2% AAEM) | 75% | 0.8 |
| Comp Paint B | Comp Ex B | Acrylic copolymer B (0 AAEM) + 0.6% Tris-A | 70% | 0.2 |
| Comp Paint C | Comp Ex C | Acrylic copolymer A (2% AAEM) + 0.1% APL | 85% | 1.2 |
| Comp Paint D | Comp Ex D | Acrylic copolymer A (2% AAEM) + 1% APL | 89% | 0.7 |
| Comp Paint E | Comp Ex E | Acrylic copolymer A (2% AAEM) + 0.3% MEA | 85% | 1.0 |
| Paint 1 | Ex 1 | Acrylic copolymer A (2% AAEM) + 0.55% Tris-A | 84% | 0.3 |
| Paint 2 | Ex 2 | Acrylic copolymer A (2% AAEM) + 0.15% APL | 83% | 0.5 |
| Paint 3 | Ex 3 | Acrylic copolymer A (2% AAEM) + 0.2% APL | 82% | 0.4 |
| Paint 4 | Ex 4 | Acrylic copolymer A (2% AAEM) + 0.3% APL | 86% | 0.4 |
| Paint 5 | Ex 5 | Acrylic copolymer A (2% AAEM) + 0.55% APL | 84% | 0.3 |
| Paint 6 | Ex 6 | Acrylic copolymer A (2% AAEM) + 0.7% APL | 85% | 0.5 |
| Paint 7 | Ex 7 | Acrylic copolymer A (2% AAEM) + 0.8% APL | 86% | 0.6 |
| Paint 8 | Ex 8 | Acrylic copolymer A (2% AAEM) + 0.9% APL | 86% | 0.6 |
| Paint 9 | Ex 9 | Acrylic copolymer A (2% AAEM) + 0.3% AEPL | 85% | 0.4 |
| Paint 10 | Ex 10 | Acrylic copolymer C (4% AAEM) + 0.55% Tris-A | 91% | 0.4 |

[1]percentage for AAEM refers weight percentage of structural units of AAEM relative to the weight of the acrylic copolymer; percentage for multihydroxy-functional amine refers to weight percentage of the multihydroxy-functional amine relative to the weight of the acrylic copolymer; percentage for MEA refers to weight percentage of MEA (excluding MEA in the neutralizer solution that was used in the neutralization step)

[2]FA efficiency was determined according to JC/T1074-2008.

[3]Δb refers to delta b before and after 1 month of heat aging at 65° C.

What is claimed is:

1. An aqueous composition consisting of:

(a) an acrylic copolymer comprising, by weight based on the weight of the acrylic copolymer, from 1% to 10% of structural units of an ethylenically unsaturated acetoacetyl functional monomer;

(b) from 0.11% to 0.9% of a multihydroxy-functional amine, by weight based on the weight of the acrylic copolymer, having the structure of formula (I):

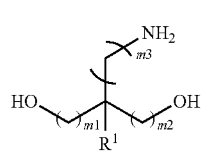

(I)

where $R^1$ is hydrogen, an alkyl group with from 1 to 10 carbon atoms, or $-(CH_2)_x-OH$, where x is from 1 to 5; $m_1$ and $m_2$ are each independently from 1 to 10; and $m_3$ is from 0 to 10; and (c) optionally, one or more additional components selected from a primary amine, a pigment, an extender, a defoamer, a thickener, a wetting agent, a dispersant, a coalescent, a biocide, and mixtures of two or more thereof.

2. The aqueous composition of claim 1, wherein, in formula (I), $m_1$ and $m_2$ are each independently from 1 to 5, and $m_3$ is from 0 to 1.

3. The aqueous composition of claim 1, wherein, in formula (I), $R^1$ is $-(CH_2)_x-OH$, where x is from 1 to 2.

4. The aqueous composition of claim 1, wherein the multihydroxy-functional amine is selected from the group consisting of tris(hydroxymethyl)aminomethane, tris(hydroxymethyl)aminoethane, tris(hydroxyethyl)aminomethane, 2-amino-1,3-propanediol, 2-amino-2-ethyl-1,3-propanediol, or mixtures thereof.

5. The aqueous composition of claim 1, comprising from 0.15% to 0.7% of the multihydroxy-functional amine, by weight based on the weight of the acrylic copolymer.

6. The aqueous composition of claim 1, further comprising the primary amine wherein the primary amine has less than two hydroxyl groups.

7. The aqueous composition of claim 6, wherein the primary amine is present in an amount to provide a molar ratio of primary amine groups to acetoacetyl functional groups in the acrylic copolymer of from 0.3 to 1.5.

8. The aqueous composition of claim 1, wherein the ethylenically unsaturated acetoacetyl functional monomer is selected from the group consisting of acetoacetoxyethyl methacrylate, acetoacetoxyethyl acrylate, acetoacetoxypropyl methacrylate, acetoacetoxybutyl methacrylate, 2,3-di (acetoacetoxy) propyl methacrylate, allyl acetoacetate, or mixtures thereof.

9. The aqueous composition of claim 1, wherein the composition includes at least one of the optional one or more additional components.

10. A method of reducing yellowing of a coating made from an aqueous composition, comprising:

incorporating in the aqueous composition from 0.11% to 0.9% of a multihydroxy-functional amine, by weight based on the weight of the acrylic copolymer;

wherein before incorporation of the multihydroxy-functional amine, the aqueous composition consists of an acrylic copolymer and optionally one or more additional components selected from a pigment, an extender, a defoamer, a thickener, a wetting agent, a dispersant, a coalescent, a biocide, and mixtures of two or more thereof, wherein the acrylic copolymer comprises, by weight based on the weight of the acrylic copolymer, from 1% to 10% of structural units of an ethylenically unsaturated acetoacetyl functional monomer; and wherein the multihydroxy-functional amine has the structure of formula (I):

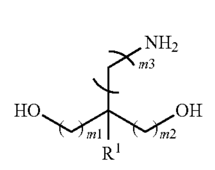

(I)

where $R^1$ is hydrogen, an alkyl group with from 1 to 10 carbon atoms, or $-(CH_2)_x-OH$, where x is from 1 to 5; $m_1$ and $m_2$ are each independently from 1 to 10; and $m_3$ is from 0 to 10.

11. The method of claim 10, wherein the multihydroxy-functional amine is selected from the group consisting of tris(hydroxymethyl)aminomethane, tris(hydroxymethyl)aminoethane, tris(hydroxyethyl)aminomethane, 2-amino-1,3-propanediol), 2-amino-2-ethyl-1,3-propanediol, or mixtures thereof.

* * * * *